United States Patent

[11] 3,596,749

| [72] | Inventors | William F. Altenpohl, Jr.; Paul J. Altenpohl, both of West Conshohocken, Pa. |
|---|---|---|
| [21] | Appl. No. | 808,941 |
| [22] | Filed | Mar. 20, 1969 |
| [45] | Patented | Aug. 3, 1971 |
| [73] | Assignee | W. F. Altenpohl, Inc. |

[54] POULTRY GRADING POSITIONER
11 Claims, 8 Drawing Figs.

[52] U.S. Cl. .................................................. 198/38,
209/121, 209/125
[51] Int. Cl. .................................................. B65g 43/00
[50] Field of Search .......................................... 17/11, 44.1;
209/74, 121, 122, 125; 198/38

[56] References Cited
UNITED STATES PATENTS

| 2,612,265 | 9/1952 | Altenpohl.................. | 209/121 |
| 3,291,303 | 12/1966 | Altenpohl.................. | 209/121 |

Primary Examiner—Richard A. Schacher
Attorneys—Clarence A. O'Brien and Harvey B. Jacobson ABSTRACT: A poultry carrying frame is suspended from a conveyor for angular positioning at a grading station and automatic reorientation to an unloading position as it is moved away from the grading station by the conveyor. The carrier frame is swivelly mounted by a link member pivotally connected between a load transferring roller assembly and the conveyor connector. A positioning arm and camming elements project from the link member for engagement by stationary elements during movement of the conveyor to effect said automatic reorientation operationally realigning the carrier frame with a release mechanism.

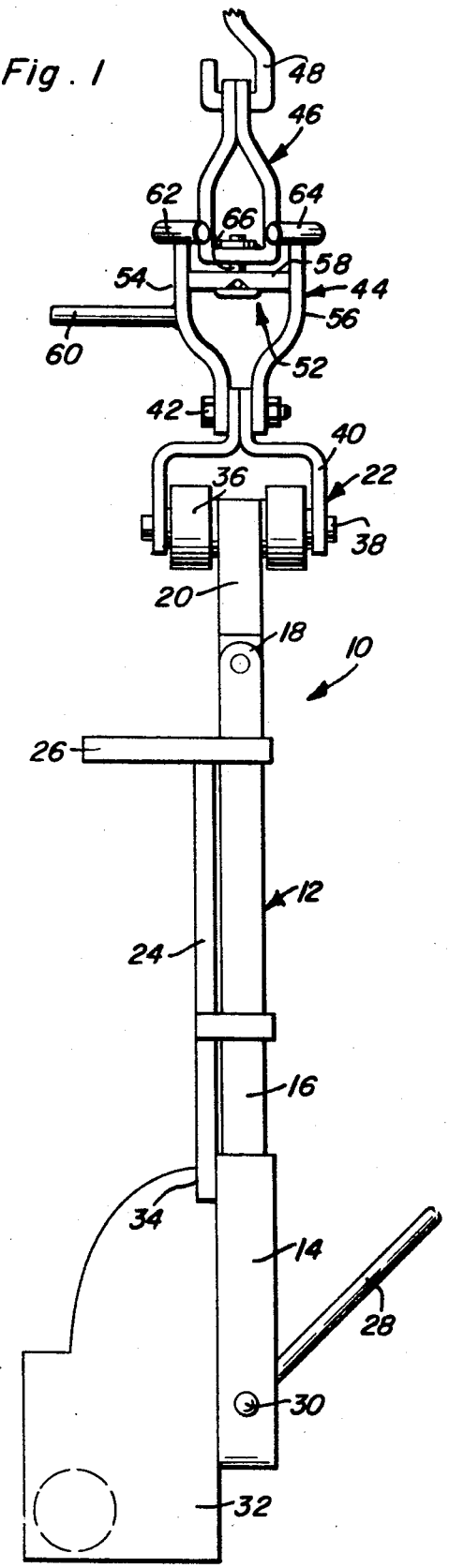
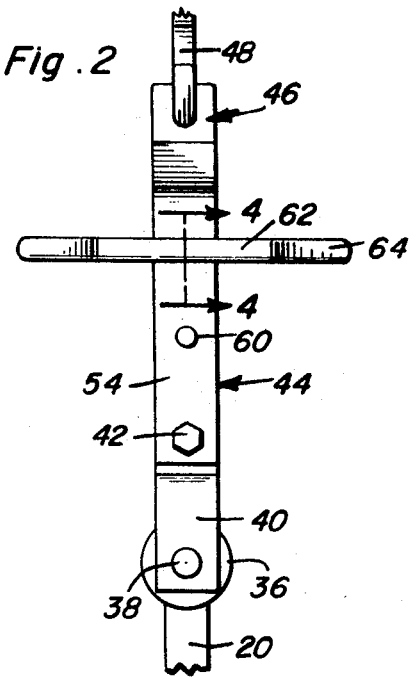
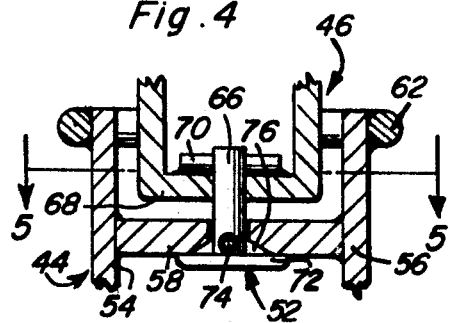
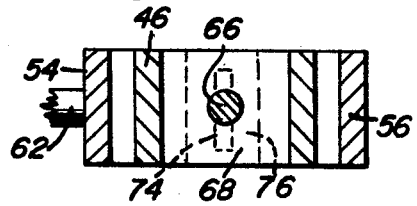

PATENTED AUG 3 1971 3,596,749
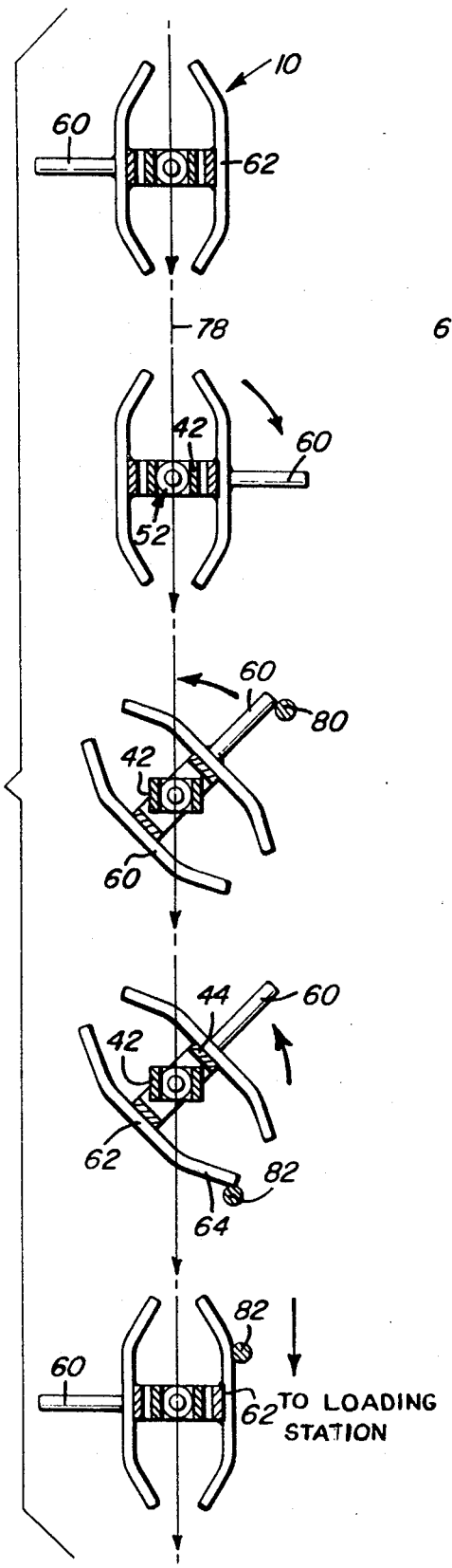
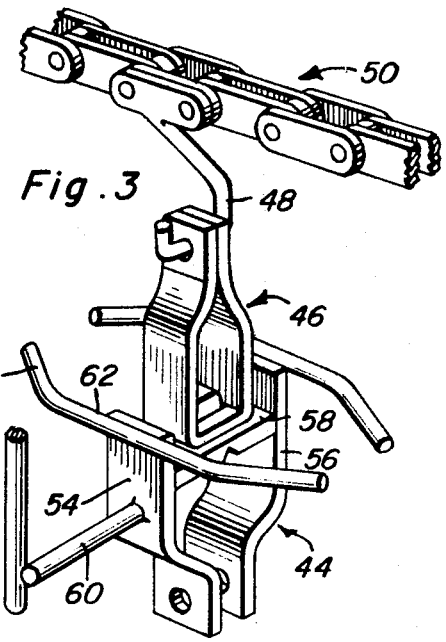
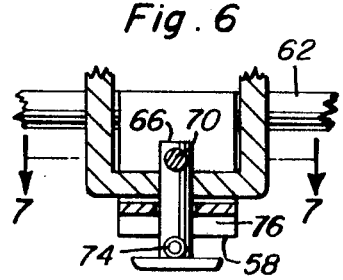
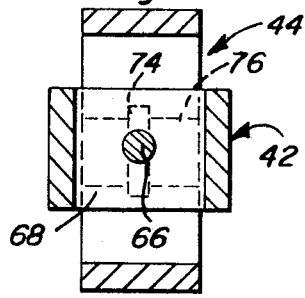
William F. Altenpohl, Jr.
Paul J. Altenpohl
INVENTORS

POULTRY GRADING POSITIONER

This invention relates to poultry handling equipment and more particularly to the angular orientation of poultry carrying frame assemblies.

It is common practice to grade poultry according to weight by means of poultry carrying frame assemblies suspended from a conveyor chain which moves along a predetermined path from a loading station through various stations including weight sorting stations. The poultry are weighed by movement of each poultry carrying frame assembly past weighing stations such as disclosed in U.S. Pat. No. 3,291,303. Usually, the poultry carrying frame assembly suspended from the conveyor chain is nonrotatable about a vertical axis so that the release arm slidably mounted on the carrier frame will be aligned with power operated release mechanism at the weight sizing station for releasing the bird carrying hook if the weight of the bird is above or below a predetermined weight limit. The load on the carrier frame is transferred from the conveyor chain to a scale track at the weighing station by means of a roller assembly pivotally interconnected between the carrier frame and the conveyor chain.

In the aforementioned type of poultry handling conveyor systems, the pivotally mounted bird hook and the hook release arm project from the carrier frame in opposite directions so that the bird hook and release arm may respectively be operatively aligned with the poultry receiving discharge bin and the release mechanism. A grader must therefore completely remove poultry, which do not qualify, from the carrier frames before they approach the weight sorting or sizing station and possibly transfer such poultry to another separate conveyor system.

Accordingly, an important object of the present invention is to provide a poultry carrying frame assembly adapted to be angularly positioned by personnel at a grading station about a vertical axis so that poultry may be operationally indexed as desired. An additional object is to effect automatic angular reorientation of the carrier frame about the vertical axis after it is weighed and prior to its return to the loading station. Thus, the arrangement of the present invention provides for greater convenience in grading the poultry and thereby contributes to a more reliable grading system.

In accordance with the present invention, a special link member pivotally interconnects the conveyor chain connector with the carrier frame assembly in order to establish a vertical axis about which the carrier frame may be angularly displaced between two operative positions at which the carrier frame is yieldably held by a detent mechanism. An angular positioning arm extends from the link member so that personnel at the grading station may readily discern the angular position and swing the carrier frame about its vertical axis if necessary to the position more convenient for grading of poultry. As the carrier frame assembly returns to the loading station, it is automatically reoriented to the proper position by sequential engagement of the positioning arm and camming elements on the link member with stationary elements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of a carrier frame assembly suspended from a conveyor chain in accordance with the present invention.

FIG. 2 is a partial front elevational view of the assembly shown in FIG. 1.

FIG. 3 is a partial perspective view of the assembly shown in FIG. 1.

FIG. 4 is an enlarged partial sectional view taken substantially through a plane indicated by section line 4—4 of FIG. 2.

FIG. 5 is a top sectional view taken substantially through a plane indicated by section line 5—5 in FIG. 4.

FIG. 6 is a partial sectional view similar to FIG. 4 but showing the carrier frame assembly angularly displaced from the position of FIG. 4 by 90°.

FIG. 7 is a top sectional view taken substantially through a plane indicated by section line 7—7 in FIG. 6.

FIG. 8 illustrates the sequential angular movement of the carrier frame assembly during travel.

Referring now to the drawings in detail, FIG. 1 illustrates an article carrying assembly generally referred to by reference numeral 10 suspended in a vertical position from a conveyor chain. The assembly 10 includes a carrier frame 12 similar to that disclosed in U.S. Pat. No. 3,291,303 aforementioned. This type of carrier frame includes a yoke portion 14 from which a shank portion 16 extends upwardly. The upper end 18 of the shank portion is pivotally connected by means of a link 20 to a load transferring roller assembly generally referred to by reference numeral 22. A latch bar 24 is slidably mounted on the shank portion 16 and connected at its upper end to a laterally projecting release lifter arm 26. The lifter arm 26 extends from the shank portion 16 of the carrier in a direction opposite to or spaced 180° from the direction in which the bird hook 28 extends from the yoke portion 14 of the carrier frame. The bird hook 28 is pivotally mounted to the yoke portion of the carrier frame about a horizontal axis extending through pivot pin 30 to which a carrier plate 32 is connected having a notch 34 within which the lower end of the latch bar 24 is received as shown. Accordingly, when a bird is carried on the upwardly extending hook 28 as shown in FIG. 1, the latch bar 24 will prevent the hook and the plate 32 from being angularly displaced by its load in a clockwise direction. The bird is released from the assembly by upward displacement of the release arm 26 withdrawing the latch bar 24 from notch 34, thereby permitting the hook 28 to pivot clockwise or downwardly as viewed in FIG. 1 so that the bird may slide off therefrom and drop into a discharge bin (not shown). A release mechanism (not shown) upwardly displaces the release arm 26 for this purpose if the load on the carrier frame assembly is above or below a predetermined weight limit.

The load of the carrier frame as aforementioned may be transferred to a weighing device for weight grading purposes by means of the roller assembly 22 which includes a pair of rollers 36 carried by a pin 38 on either side of the link 20. The pin 38 is carried between a pair of support arms 40 which straddle the link 20, the upper ends of the support arms 40 being connected by the fastener assembly 42 to the lower end of a link member generally referred to by reference numeral 44. The link member 44 is in turn pivotally connected to a connector member 46 suspended from a link of the conveyor chain 50 by a hook portion 48 as shown in FIG. 3.

Referring now to FIGS. 1, 2 and 3, it will be apparent that the carrier frame assembly 12 in addition to being pivotally displaceable about a horizontal axis extending through the roller pin 38, will also be angularly displaceable about a vertical axis established between the connector 46 and the link member 44. The connector 46 itself is not angularly displaceable about a vertical axis since it is suspended from the hook portion 48 of the conveyor chain 50. Thus, as shown in FIG. 1, a swivel pin assembly 52 interconnects the connector 46 with the link member 44. The link member includes a pair of side portions 54 and 56, the lower ends of which are connected by the fastener assembly 42 to the load transferring roller assembly 22. A crossbar 58 bridges the side portions 54 and 56 and is welded thereto in vertically spaced relation to the fastener assembly 42. Extending laterally from one of the side portion 54 of the link member, is a positioning arm 60 while camming elements 62 are welded to the upper ends of the side portions vertically spaced above the positioning arm. The camming elements extend generally perpendicular to the positioning arm 60 and have inturned end portions 64.

Referring now to FIGS. 4 and 5, it will be observed that the swivel pin assembly 52 includes a shank portion 66 that is rigidly connected to the lower portion 68 of connector 46 by a pin 70 welded to the connector. The shank 66 projects downwardly from the connector through an opening in the crossbar 58 with a loose fit so that the link member 44 may be angularly displaced relative to the connector about a vertical axis extending through the shank 66. Secured to the lower end of the shank 66 above the head 72 is a tubular detent pin 74. A detent notch 76 is formed in the lower surface of the crossbar 58 intersecting the vertical axis of the swivel pin. Further, the axial length of the swivel pin between the connector and the crossbar 58 is such as to provide axial clearance between the lower portion of the connector and the crossbar 58. The detent pin 74 on the shank 66 will therefore be received in notch 76 in order to yieldably hold the link member and the load suspended therefrom in one of two predetermined angular positions relative to the conveyor chain 50 from which the connector 46 is suspended. The link member 44 may nevertheless be angularly displaced between these two positions in which case it is upwardly displaced relative to the connector as the detent pin 74 moves out of notch 76 as shown in FIGS. 6 and 7.

Referring now to FIG. 8, the operation and utility of the present invention will become apparent. As diagrammatically shown, the article carrying assembly 10 is conveyed by the conveyor from which it is suspended along a predetermined path 78 with the positioning arm 60 projecting laterally thereof from the link member in one direction vertically aligned above the release arm 26 as the assembly approaches a grading station. For grading purposes, an operator or grader will grasp the carrier assembly and manually displace it about the vertical swivel axis by 180° as shown in FIG. 8 orientating the release arm 26 to an inoperative position with respect to at least one weight sizing station, for example, to be bypassed during subsequent travel of the carrier assembly. A single conveyor system may thereby handle poultry of different grades to avoid manual transfer of poultry by the grader. In view of the detent arrangement hereinbefore described, which becomes fully seated only in two positions spaced 180° apart, the grader may accurately position the carrier assembly in accordance with the poultry grade at the grading station without any guesswork. The carrier assembly will then continue to move along the path 78 through various operational stations in a direction indicated in FIG. 8.

Angular return movement is initially imparted to the poultry carrying assembly during return travel toward a loading station along the path portion 78a when the positioning arm 60 engages a stationary element 80 as shown which will cause approximately 45° displacement of the assembly from the position to which it was previously manually displaced by the operator at the grading station. As the assembly continues to travel along the path 78a, the inturned end portion 64 of one of the camming elements 62 engages a second stationary element 82 causing further angular displacement of the assembly by approximately 135° in the same counterclockwise direction as viewed in FIG. 8. Thus, when the assembly passes the element 82 as shown in the lower portion of FIG. 8, it will have been angularly displaced to the other operative position prior to arriving at the loading station to begin a new cycle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. In combination with an elongated conveyor and an article carrying device suspended therefrom for movement along a predetermined path between at least two operational stations, means for angularly orientating the article carrying device about a substantially vertical axis comprising means for selectively positioning the device in one position about said vertical axis at one of the two stations, and means responsive to movement of the device by the conveyor toward the other of the two stations for angularly displacing the device to a second position about the vertical axis.

2. The combination of claim 1 wherein said article carrying device includes a carrier frame and load transferring means pivotally connected to the carrier frame and a connector suspended from the conveyor, a link member pivotally connected by the load transferring means to the carrier frame about a pivot axis substantially parallel to and spaced below the conveyor, and swivel means pivotally connecting the link member to the connector about said vertical axis intersecting the pivot axis.

3. The combination of claim 2 wherein said means for angularly displacing the device includes a positioning arm connected to and laterally projecting from the link member, a camming element secured to the link member in transverse spaced relation to the positioning arm and a plurality of stationary elements sequentially engageable with the positioning arm and the camming element to incrementally displace the link member about the vertical axis.

4. The combination of claim 3 wherein said selective positioning means includes detent means yieldably holding the link member and the article carrying device only in either of said two positions.

5. The combination of claim 4 wherein the swivel means includes a swivel pin secured to the connector and projecting through the link member and a head secured to the swivel pin adapted to engage the link member in spaced relation to the connector, said detent means including a projection mounted on the pin receivable in a notch formed in the link member intersecting the vertical axis.

6. The combination of claim 5 wherein said article carrying device further includes a hook pivotally mounted on the carrier frame and a release arm slidably mounted on the carrier frame, said hook and release arm projecting from the carrier frame spaced 180° relative to each other about the vertical axis, said release arm being aligned with and spaced below the positioning arm.

7. The combination of claim 1 wherein the relative positioning means includes detent means yieldably holding the article carrying device only in either of said two positions.

8. The combination of claim 7 wherein said article carrying device includes a carrier frame and load transferring means pivotally connected to the carrier frame and a connector suspended from the conveyor, a link member pivotally connected by the load transferring means to the carrier frame about a pivot axis substantially parallel to and spaced below the conveyor, and swivel means pivotally connecting the link member to the connector about said vertical axis intersecting the pivot axis.

9. The combination of claim 8 wherein the swivel means includes a swivel pin secured to the connector and projecting through the link member and a head secured to the swivel pin adapted to engage the link member in spaced relation to the connector, said detent means including a projection mounted on the swivel pin receivable in a notch formed in the link member intersecting the vertical axis.

10. The combination of claim 1 wherein said article carrying device includes a release element projecting therefrom, said release element being operatively orientated relative to said vertical axis in only one of said two positions of the article carrying device.

11. In combination with a conveyor and a carrier frame, means for angularly orientating the carrier frame relative to the conveyor comprising swivel means for rotatably suspending the carrier frame from the conveyor about a substantially vertical axis, means for selectively positioning the carrier frame in a first angular position relative to said vertical axis, means for incrementally displacing the carrier frame toward a second angular position during movement of the conveyor by a predetermined distance, and means for releasably holding said carrier frame in said first and second positions.